(12) United States Patent
Hong et al.

(10) Patent No.: US 11,372,497 B2
(45) Date of Patent: Jun. 28, 2022

(54) TOUCH SENSING DEVICE AND REFERENCE SIGNAL GENERATION CIRCUIT

(71) Applicant: Samsung Electro-Mechanics Co., Ltd., Suwon-si (KR)

(72) Inventors: Byung Joo Hong, Suwon-si (KR); Joo Yul Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/186,988

(22) Filed: Feb. 26, 2021

(65) Prior Publication Data

US 2022/0050546 A1 Feb. 17, 2022

(30) Foreign Application Priority Data

Aug. 11, 2020 (KR) .................. 10-2020-0100696
Nov. 11, 2020 (KR) .................. 10-2020-0150079

(51) Int. Cl.
*G06F 3/041* (2006.01)

(52) U.S. Cl.
CPC .. *G06F 3/0416* (2013.01); *G06F 2203/04105* (2013.01)

(58) Field of Classification Search
None
See application file for complete search history.

(56) References Cited

U.S. PATENT DOCUMENTS

| 2009/0260898 A1 | 10/2009 | Jin et al. |
| 2018/0284928 A1* | 10/2018 | Kremin ............ G06F 3/0446 |
| 2021/0041982 A1 | 2/2021 | Hong et al. |

FOREIGN PATENT DOCUMENTS

| JP | H11-194863 A | 7/1999 |
| JP | 2007-208682 A | 8/2007 |
| KR | 10-2009-0111429 A | 10/2009 |
| KR | 10-2010-0051454 A | 5/2010 |
| KR | 10-2137092 B1 | 7/2020 |

OTHER PUBLICATIONS

Korean Office Action dated Feb. 28, 2022, in counterpart Korean Patent Application No. 10-2020-0150079 (9 pages in English and 7 pages in Korean).

* cited by examiner

*Primary Examiner* — Stephen T. Reed
(74) *Attorney, Agent, or Firm* — NSIP Law

(57) ABSTRACT

A touch sensing device includes: a first signal conversion circuit configured to convert a first sensing signal from a first sensor unit into a first detection signal, the first detection signal being a digital signal; a signal operation circuit configured to operate the first detection signal and a high-frequency signal based on the first detection signal, to generate an operation output signal; and a touch detector configured to determine whether a touch manipulation has occurred, based on the operation output signal, to generate a touch detection signal having determination result information.

24 Claims, 20 Drawing Sheets

TOUCH SENSING DEVICE AND REFERENCE SIGNAL GENERATION CIRCUIT

CROSS-REFERENCE TO RELATED APPLICATIONS

This application claims the benefit under 35 U.S.C. § 119(a) of Korean Patent Application No. 10-2020-0100696 filed on Aug. 11, 2020 and Korean Patent Application No. 10-2020-0150079 filed on Nov. 11, 2020, in the Korean Intellectual Property Office, the entire disclosures of which are incorporated herein by reference for all purposes.

BACKGROUND

1. Field

The following description relates to a touch sensing device and a reference signal generation circuit.

2. Description of Related Art

In general, wearable devices have become thinner and simpler and have been implemented with sleeker, more elegant designs. Thus, existing mechanical switches are being eliminated in wearable devices, along with the implementation of dustproof and waterproof technologies, as well as the development of an integrated model with a smooth design.

Currently, technologies such as touch on metal (ToM) technology that implements touch inputs on metal, capacitor sensing technology using touch panels, micro-electro-mechanical-system (MEMS), and micro strain gauges are being developed. Furthermore, a force touch function is also being developed.

In the case of an existing mechanical switch, a large size of the mechanical switch and a large internal space are required to implement the function(s) of the switch. Thus, there may be a disadvantage that the exterior of the wearable device may not be sleek or elegant, due to a shape protruding to the outside of an external case or the structure not being integrated with the external case. Additionally, the wearable device may occupy a relatively large space.

In addition, there is a risk of electric shocks due to direct contact with a mechanical switch that is electrically connected. In particular, there is a disadvantage that it may be difficult to obtain a waterproof and dustproof construction of the wearable device due to structural characteristics of the mechanical switch.

Furthermore, even in a conventional switch device having a touch switch that replaces a mechanical switch, in the case of detecting a push applied to a touch sense member using pushing force, there may be a problem in that the sensing device malfunctions when unintended pushing force is applied by an external object.

In addition, in the case in which pressing of a touch switch member is pressed several times in rapid succession, there may be a problem in that the sensing device malfunctions. For example, a plurality of continuous presses may not be sensed, a plurality of continuous presses maybe sensed as a single press, or a plurality of continuous presses may otherwise be sensed incorrectly.

In addition, when a differential signal of the sensor is used, there may be a problem in that a situation in which a push is not sensed may occur when a push input is applied to a touch switch member slowly, as compared to the conventional case.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a touch sensing device includes: a first signal conversion circuit configured to convert a first sensing signal from a first sensor unit into a first detection signal, the first detection signal being a digital signal; a signal operation circuit configured to operate the first detection signal and a high-frequency signal based on the first detection signal, to generate an operation output signal; and a touch detector configured to determine whether a touch manipulation has occurred, based on the operation output signal, to generate a touch detection signal having determination result information.

The touch sensing may further include a reference signal generation circuit configured to generate a reference signal based on the first detection signal.

The touch sensing device may further include a second signal conversion circuit configured to convert a second sensing signal from a second sensor unit into a second detection signal, the second detection signal being another digital signal.

The reference signal generation circuit may be further configured to: use the second sensor unit to determine whether a change in signal of the second detection signal occurs; and perform either one of setting the reference signal as a specific value, in response to determining that the change in signal of the second detection signal occurs, and using the first detection signal to change a current reference signal, in response to determining that the change in signal of the second detection signal does not occur.

The reference signal generation circuit may include: a signal change detector configured to detect a change in the second detection signal to output a change detection signal; and a reference signal generator. The reference signal generator may be configured to: determine whether a change in signal of the second detection signal occurs, based on the change detection signal; and perform either one of setting the reference signal as a specific value, in response to determining that the change in signal of the second detection signal occurs, and using the first detection signal to set the reference signal, in response to determining that the change in signal of the second detection signal does not occur.

The reference signal generation circuit may include: a signal inputter configured to output a signal change value of a second detection signal; a storage configured to store the second detection signal and the signal change value, upon the second detection signal and the signal change value being input from the signal inputter; a signal determiner configured to generate a change detection signal including information indicating that there is a change in the second detection signal when the signal change value is equal to or greater than a change threshold value, and information indicating that there is no change in the second detection signal when the signal change value is lower than the change threshold value; and a reference signal generator. The reference signal generator may be configured to: determine whether a change in signal of the second detection signal occurs, based on the change detection signal; and perform either one of setting the reference signal as a specific value, in response to determining that the change in signal of the second detection signal occurs, and using the first detection signal to change the reference signal, in response to determining that the change in signal of the second detection signal does not occur.

The touch detector may include: a first change detector configured to detect a change in the first detection signal to generate the touch detection signal having the detection result information; a second change detector configured to detect a change in the first detection signal to output a change detection signal having additional detection result information; and a detection signal generator configured to generate a final touch detection signal having final information indicating whether the touch manipulation has occurred by the first sensor unit, based on the touch detection signal and the change detection signal.

The reference signal generation circuit may be further configured to change the reference signal, based on a low-frequency signal value of the first detection signal.

The signal operation circuit may include: a first operation circuit configured to generate a first operation signal having high-frequency information of the first detection signal; a second operation circuit configured to generate a second operation signal having difference value information representing a difference between the first detection signal and the reference signal; and a third operation circuit configured to operate the first operation signal and the second operation signal to generate the operation output signal.

The first operation circuit may include: a delay circuit configured to delay the first detection signal to output a delay signal; a first subtraction circuit configured to subtract the delay signal from the first detection signal to generate the high-frequency signal; and a first gain control circuit configured to multiply the high-frequency signal by a first gain to generate the first operation signal.

The second operation circuit may include: a second subtraction circuit configured to subtract the reference signal from the first detection signal to generate a difference signal; and a second gain control circuit configured to multiply the difference signal by a second gain to generate the second operation signal.

The reference signal generation circuit may include: a direct current (DC) signal generator configured to detect a low-frequency signal value of the first detection signal; and a reference signal generator configured to use the low-frequency signal value to generate the reference signal.

The high-frequency signal may be any one of a slope signal based on the first detection signal, a differential signal for the first detection signal, a high-frequency filter signal based on the first detection signal, a bandpass filter signal based on the first detection signal, and a signal resulting from a low-frequency signal being removed from the first detection signal.

In another general aspect, a reference signal generation circuit includes: a signal change detector configured to detect a change in a second detection signal input from a second sensor unit, to output a change detection signal; and a reference signal generator. The reference signal generator may be configured to: determine whether a change in signal of the second detection signal occurs, based on the change detection signal; and perform either one of setting a reference signal for a first detection signal input from a first sensor unit as a specific value, in response to determining that the change in signal of the second detection signal occurs, and using the first detection signal to change the reference signal, in response to determining that the change in signal of the second detection signal does not occur.

The signal change detector may be further configured to: generate a signal change value for the second detection signal input from the second sensor unit; and generate a change detection signal including information indicating that there is a change in the second detection signal when the signal change value is equal to or greater than a change threshold value, and information indicating that there is no change in the second detection signal when the signal change value is lower than the change threshold value.

The signal change detector may include: a signal inputter configured to output a signal change value for the second detection signal; a storage configured to store the second detection signal and the signal change value, input from the signal input unit; a signal determiner configured to determine a change detection signal including information indicating that there is a change in the second detection signal when the signal change value is equal to or greater than a change threshold value, and information indicating that there is no change in the second detection signal when the signal change value is lower than the change threshold value; and a reference signal generator. The reference signal generator may be configured to: determine whether the change in signal of the second detection signal occurs based on the change detection signal; and perform either one of the setting of the reference signal as a specific value, in response to determining that the change in signal of the second detection signal occurs, or the using of the first detection signal to change the reference signal, in response to determining that the change in signal of the second detection signal does not occur.

The specific value of the reference signal generator may be determined as any one of a current value of the first detection signal, a value of the first detection signal before a predetermined time, and a value of the first detection signal after a predetermined time, based on a point in time when it is determined that the change in signal of the second detection signal occurs.

The first sensor unit may be a force sensor configured to sense force. The second sensor unit may be configured to sense a touch, and may be any one of a touch sensor, an ultrasonic sensor, a temperature sensor, a proximity sensor, and an optical sensor.

The force sensor may be a pressure sensor configured to implement any one of a resistance change method, a capacitive method, an inductive method, and a piezo method.

In another general aspect, an electronic device includes: a cover; a touch member formed in a portion of the cover; a first sensor unit configured to generate a first detection signal that varies in response to a touch applied to the touch member; a second sensor unit configured to generate a second detection signal that varies in response to pressure applied to the touch member; a reference signal generation circuit configured to generate a reference signal based on the first detection signal, and further based on whether a change in the second detection signal occurs; and a signal operation circuit configured to generate an operation output signal based on the first detection signal and the reference signal.

The reference signal generation circuit may be further configured to: set the reference signal as a specific value, in response to determining that the change in the second detection signal occurs; or use the first detection signal to change the reference signal, in response to determining that the change in the second detection signal does not occur.

The reference signal generation circuit may be further configured to generate the reference signal based on a direct current value of the first detection signal.

The signal operation circuit may be further configured to generate the operation output signal based on any one of a slope signal based on the first detection signal, a differential signal for the first detection signal, a high-frequency filter signal based on the first detection signal, a bandpass filter signal based on the first detection signal, and a signal resulting from a low-frequency signal being removed from the first detection signal.

The electronic device may further include a touch detector configured to generate a touch detection signal indicating whether a touch manipulation has been applied to the touch member, by comparing the operation output signal to a threshold value.

The touch detector may be further configured to: generate a change detection signal including change detection information of the second detection signal; and generate a final touch detection signal indicating whether the touch manipulation has been applied to the touch member, based on the touch detection signal and the change detection signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
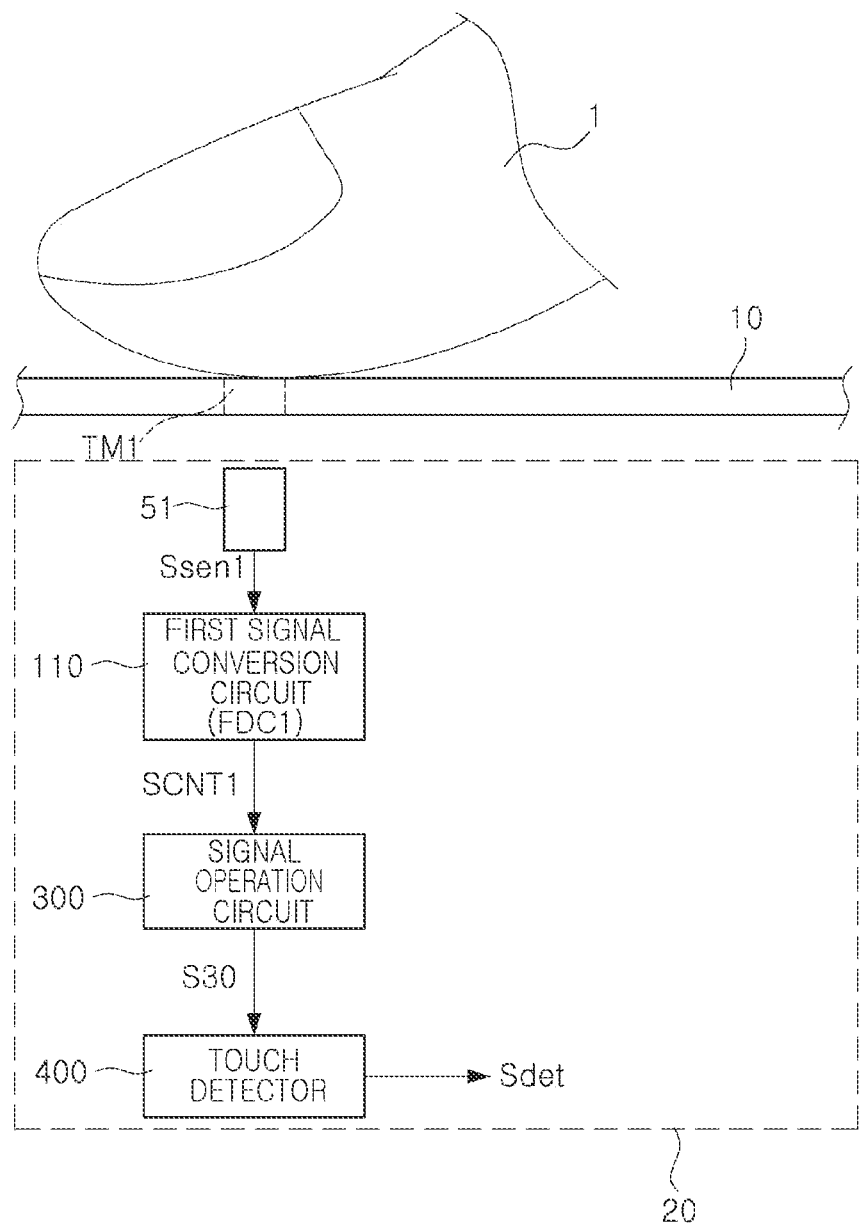
FIG. 1 is an example view illustrating a touch sensing device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

Figure 2:
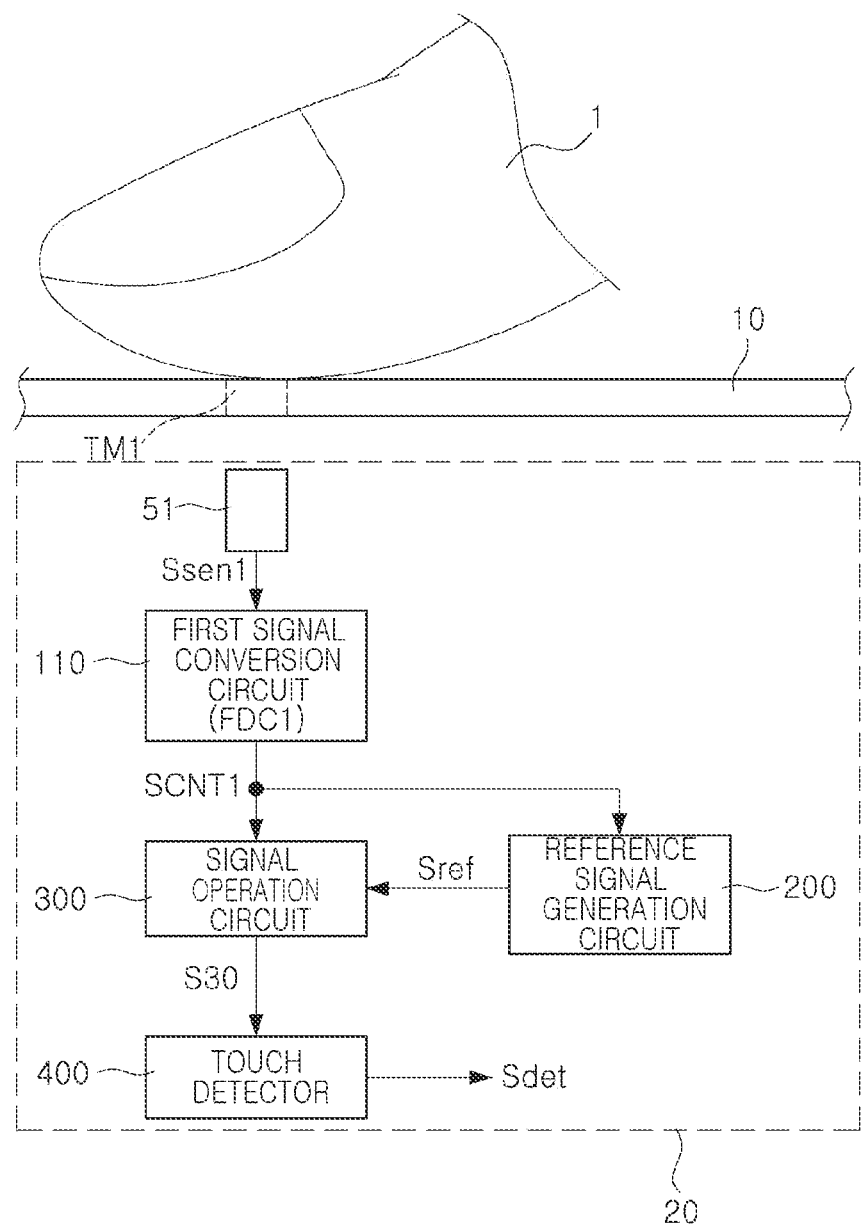
FIG. 2 is an example view illustrating the touch sensing device, according to an embodiment.
Figure 3:
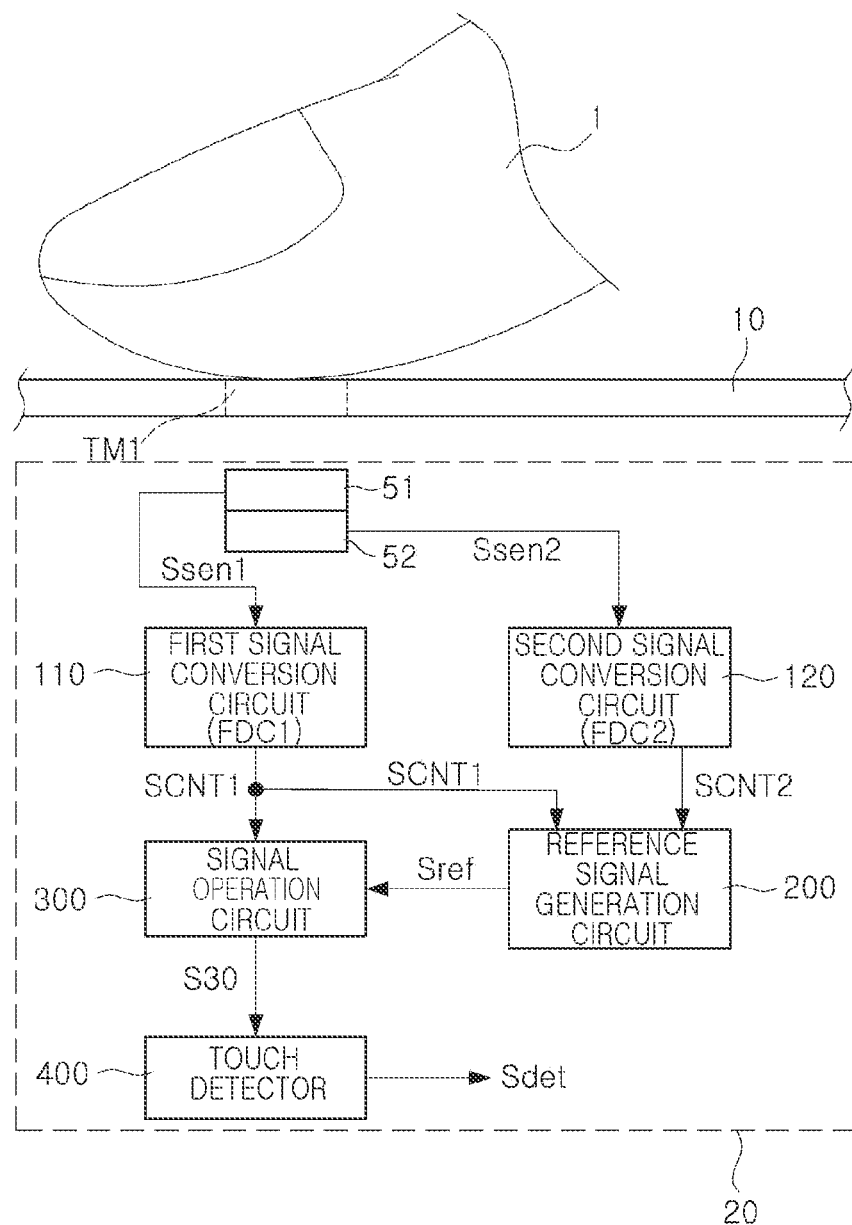
FIG. 3 is an example view illustrating the touch sensing device, according to an embodiment.

FIG. 1 is an example view illustrating a touch sensing device 20, according to an embodiment of the present disclosure, FIG. 2 is an example view illustrating the touch sensing device 20, according to an embodiment. FIG. 3 is an example view illustrating the touch sensing device 20, according to an embodiment.

Referring to FIG. 1, the touch sensing device 20 may include a first signal conversion circuit 110, a signal operation circuit 300, and a touch detector 400.

The first signal conversion circuit 110 may convert a first sensing signal Ssen1 from a first sensor unit 51 into a first detection signal SCNT1. The first detection signal SCNT1 is a digital signal. As an example, the first signal conversion circuit 110 may include a first frequency-digital converter (FDC1).

The signal operation circuit 300 may perform a logic operation on the first detection signal SCNT1 and a high-frequency signal Sslp based on the first detection signal SCNT1, to generate an operation output signal S30.

The touch detector 400 may determine whether a touch manipulation has occurred based on the operation output signal S30, to generate a touch detection signal Sdet having determination result information about whether the touch manipulation has occurred.

For example, the high-frequency signal Sslp may be any one selected from a slope signal based on the first detection signal SCNT1, a differential signal for the first detection signal SCNT1, a high-frequency filter signal based on the first detection signal SCNT1, a bandpass filter signal based on the first detection signal SCNT1, and a signal in which a low-frequency signal has been removed from the first detection signal SCNT1. However, the high-frequency signal Sslp is not limited to the aforementioned examples.

The touch sensing device 20 may further include a reference signal generation circuit 200 (FIG. 2), which will be described with reference to FIG. 2.

Referring to FIGS. 2 and 3, the touch sensing device 20 may include the first signal conversion circuit 110, a reference signal generation circuit 200, the signal operation circuit 300, and the touch detector 400.

Referring to FIG. 3, the touch sensing device 20 may include the first signal conversion circuit 110, a second signal conversion circuit 120, the reference signal generation circuit 200, the signal operation circuit 300, and the touch detector 400.

The first sensor unit 51 and a second sensor unit 52 may be arranged adjacent to each other in a vertical direction, as illustrated in FIG. 3, or may be arranged side-by-side in a different manner. When the first sensor unit 51 and the second sensor unit 52 are arranged to sense a touch by a single touch manipulation of a user, there may be no need for the first sensor unit 51 and the second sensor unit 52 to be limited to a particular arrangement.

Referring to FIGS. 2 and 3, the first sensor unit 51 may output the first sensing signal Ssen1. For example, the first sensor unit 51 may be disposed inside a first touch member TM1, which may be a portion of a cover 10 of an electronic device. As an example, the first sensor unit 51 may include a sensing coil configured to generate the first sensing signal Ssen1 having touch manipulation information when a user 1 touches the first touch member TM1.

In the description herein, the touch or touch manipulation may include a touch contact without pressing, and touch force, corresponding to pressing accompanied by force, following the touch contact. In the description herein, unless a specific term is specifically referred to, a touch may refer to either one or both of the touch contact and the touch force.

The first signal conversion circuit 110 may convert the first sensing signal Ssen1 into a first detection signal SCNT1, which is a digital signal. As an example, the first signal conversion circuit 110 may include the first frequency-digital converter (FDC1).

For example, as the first touch member TM1 is touched, the first frequency-digital converter FDC1 may receive a signal generated from a resonance circuit by the sensing coil and a capacitor, which are included in the first sensor unit 51, and may convert the received signal into the first detection signal SCNT1.

The reference signal generation circuit 200 may generate a reference signal Sref based on the first detection signal SCNT1. For example, the reference signal generation circuit 200 may generate the reference signal Sref based on a low-frequency signal value of the first detection signal SCNT1. In this case, the low-frequency signal value may be a generic concept including a direct current (DC) value.

The signal operation circuit 300 may operate a high-frequency signal Sslp based on the first detection signal SCNT1, the first detection signal SCNT1, and the reference signal Sref, to generate an operation output signal S30. For example, the signal operation circuit 300 may add the first detection signal SCNT1 to the high-frequency signal Sslp based on the first detection signal SCNT1, and may subtract the reference signal Sref therefrom, to output the operation output signal S30.

The touch detector 400 may determine whether or not a touch manipulation has occurred based on the operation output signal S30, to generate a touch detection signal Sdet having determination result information. For example, the touch detector 400 may generate a touch detection signal Sdet having a high level ("1") when a value of the operation output signal S30 is equal to or greater than a threshold value, or a low level ("0") when the value of the operation output signal S30 is lower than the threshold value.

In addition, the touch detector 400 may set a hysteresis upper limit threshold value and a hysteresis lower limit threshold value, based on the threshold value, and may perform a hysteresis comparison operation.

Referring to FIG. 3, the second sensor unit 52 may output a second sensing signal Ssen2. For example, the second sensor unit 52 may be disposed inside the first touch member TM1, which may be a portion of the cover 10 of the electronic device, together with the first sensor unit 51. For example, the second sensor unit 52 may include a sensing coil configured to generate the second sensing signal Ssen2 having touch manipulation information, when the user 1 touches the first touch member TM1.

In the description herein, the first sensor unit 51 may be a force sensor configured to sense force, and the second sensor unit 52 may be any one selected from a touch sensor, an ultrasonic sensor, a temperature sensor, a proximity sensor, and an optical sensor, configured to sense a touch. As an example, the force sensor may be a pressure sensor adopting any one selected from a resistance change method, a capacitive method, an inductive method, and a piezo method.

The above-described examples are only illustrative and are not limiting.

The second signal conversion circuit 120 may convert the second sensing signal Ssen2 into a second detection signal SCNT2, which is a digital signal. As an example, the second signal conversion circuit 120 may include a second frequency-digital converter (FDC2).

For example, as the first touch member TM1 is touched, the second frequency-digital converter FDC2 may receive a signal generated from a resonance circuit by the sensing coil and a capacitor, which are included in the second sensor unit 52, and may convert the received signal into the second detection signal SCNT2.

In this case, based on the second detection signal SCNT2, depending on whether or not a touch manipulation has occurred by the second sensor unit 52, the reference signal generation circuit 200 may generate the reference signal Sref based on the first detection signal SCNT1. For example, when the second sensor unit 52 is used, the reference signal generation circuit 200 may generate the reference signal Sref, depending on whether there is a change in the second detection signal SCNT2 according to touch detection and touch release by the second sensor unit 52. For example, when there is a change in the second detection signal SCNT2, the reference signal Sref may be set and maintained as a specific value. When there is no change in the second detection signal SCNT2, the first detection signal SCNT1 may be used to change the reference signal Sref in real time or periodically.

The first sensor unit 51 and the second sensor unit 52 may include a sensor configured to sense touch manipulation on the cover 10 of the electronic device, respectively. For example, the first sensor unit 51 and the second sensor unit 52 may be a hybrid sensor unit configured to perform a sensing operation in response to a single touch manipulation.

For example, the first sensor unit 51 may be a touch force sensor having an inductive sensing type, and the second sensor unit 52 may be a touch contact sensor having a capacitive sensing type. As another example, the first sensor unit 51 may be a touch force sensor having an inductive sensing type, and the second sensor unit 52 may be an optical sensor configured to transmit and receive an optical signal. The above-described examples are only illustrative to explain the disclosure herein, and are not limiting.

The disclosure herein provides a technique capable of using not only a change in signal magnitude but also a change rate of the signal magnitude by signal operation processing to sense touch manipulation at a high speed and continuously when performing sensing by the first sensor unit 51, and a technique capable of preventing a touch malfunction by using a second sensor unit 52, different from the first sensor unit 51, to generate a reference signal corresponding to a low-frequency signal value of a first detection signal SCNT1 in a state in which there is no touch manipulation by the first sensor unit 51, and to detect a touch signal when generating the reference signal.

Embodiments of the disclosure herein may be implemented to have a hardware form such as a logic circuit, a software form such as a program, or a combination thereof, and are not limited to a particular form or a method to be implemented.

For each of the drawings of the disclosure, unnecessarily duplicated descriptions may be omitted for the same reference numerals and components having the same functions, and possible differences for each of the drawings may be described.

Figure 4:
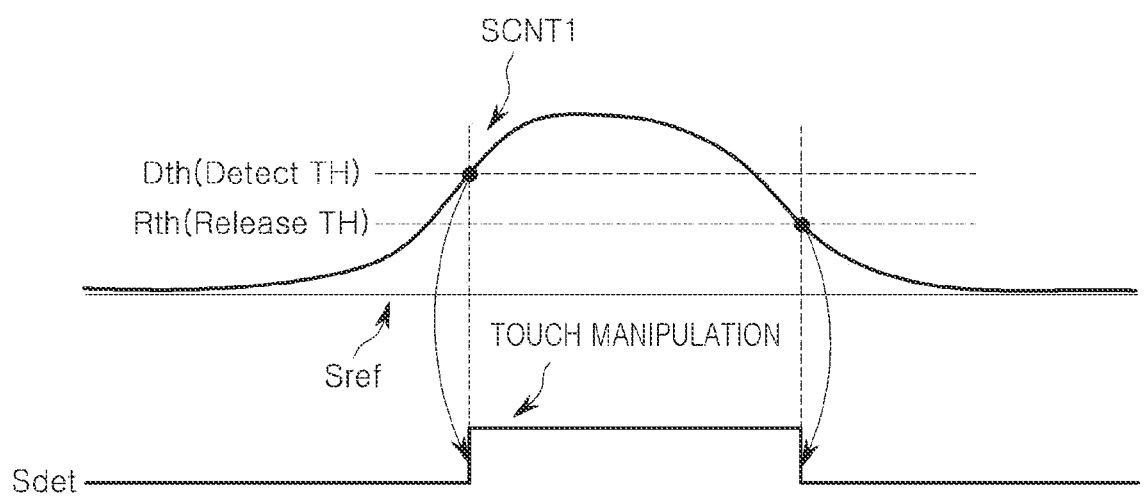
FIG. 4 is an example view illustrating waveforms of a first detection signal and a touch detection signal, according to an embodiment.

FIG. 4 is an example view illustrating waveforms of a first detection signal and a touch detection signal.

Referring to FIG. 4, a basic touch sensing operation of directly generating a touch detection signal Sdet based on a first detection signal SCNT1, without using an operation output signal S30 according to the disclosure herein, will be described.

FIG. 4 illustrates that, based on a reference signal Sref, a magnitude of the first detection signal SCNT1 may gradually increase when there is a touch manipulation, and magnitude of the first detection signal SCNT1 may gradually decrease when the touch manipulation is released, for example.

When a magnitude of the first detection signal SCNT1 is greater than a detection threshold value Dth, a level of the touch detection signal Sdet may be high. When a magnitude of the first detection signal SCNT1 is less than a release threshold value Rth, a level of the touch detection signal Sdet may be low.

For example, a value of a first detection signal SCNT1 generated by a touch manipulation (e.g., touch force) of a first touch member TM1 formed on a cover 10 of an electronic device, by a user, may increase. In this case, a low-frequency signal value of the first detection signal SCNT1 in a state in which no touch manipulation is applied may be the reference signal Sref. When there is a touch manipulation, a difference between the first detection signal SCNT1 and the reference signal Sref may be a sensing value at the corresponding moment. In this case, it may be determined whether touch manipulation is sensed and whether touch manipulation is released at the detection and release threshold values Dth and Rth, respectively.

As illustrated in FIG. 4, in the case in which a touch sensing operation is performed, and a touch manipulation and release of the touch manipulation are sensed only with a signal magnitude by the touch manipulation, when a user quickly and continuously operates a plurality of touches, a second touch manipulation may be applied while the first touch manipulation is not completely removed. When a plurality of touch manipulations are quickly and continuously applied, the plurality of touch manipulations may not be sensed or may not be sensed accurately. This case will be described with reference to FIG. 5.

Figure 5:
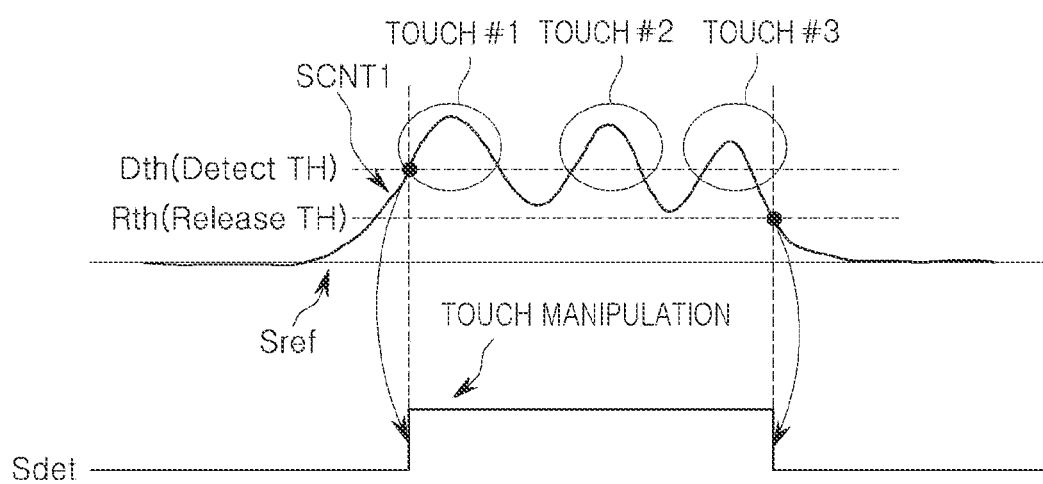
FIG. 5 is an example view illustrating waveforms of a first detection signal and a touch detection signal, for a plurality of continuous touch manipulations at high speed, according to an embodiment.

FIG. 5 is an example view illustrating waveforms of a first detection signal and a touch detection signal, in a case in which a plurality of continuous touch manipulations are applied at high speed.

In a case in which touch manipulations are repeatedly applied and released, quickly and continuously, it may be difficult for the touch sensing detection method described in FIG. 4 to sense each of several touch manipulations, as illustrated in FIG. 5.

Since the user rapidly repeatedly applies and releases the continuous touch manipulation, it may be necessary to quickly sense the continuous touch manipulation.

In particular, since a first touch member TM1 in an electronic device to which a touch sensing device is applied may not visually reveal a button shape outside the electronic device, a case in which a user continuously applies a next touch manipulation to quickly manipulate the first touch member TM1, in a situation in which a first touch manipulation is not completely released, may occur.

For example, as illustrated in FIG. 5, there may be a problem that the touch sensing device senses only one (1) touch manipulation being applied, in a situation in which three (3) continuous touch manipulations (touch #1, touch #2, and touch #3) are applied.

Such a problem may be solved by the devices and methods disclosed herein, which will be described in more detail later.

Figure 6:
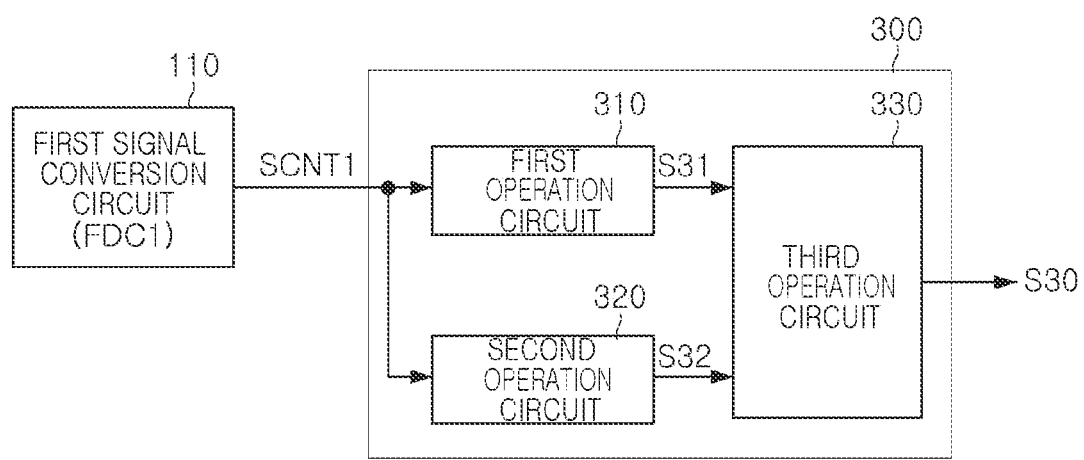
FIG. 6 is an example view illustrating an internal configuration of a signal operation circuit, according to an embodiment.
Figure 7:
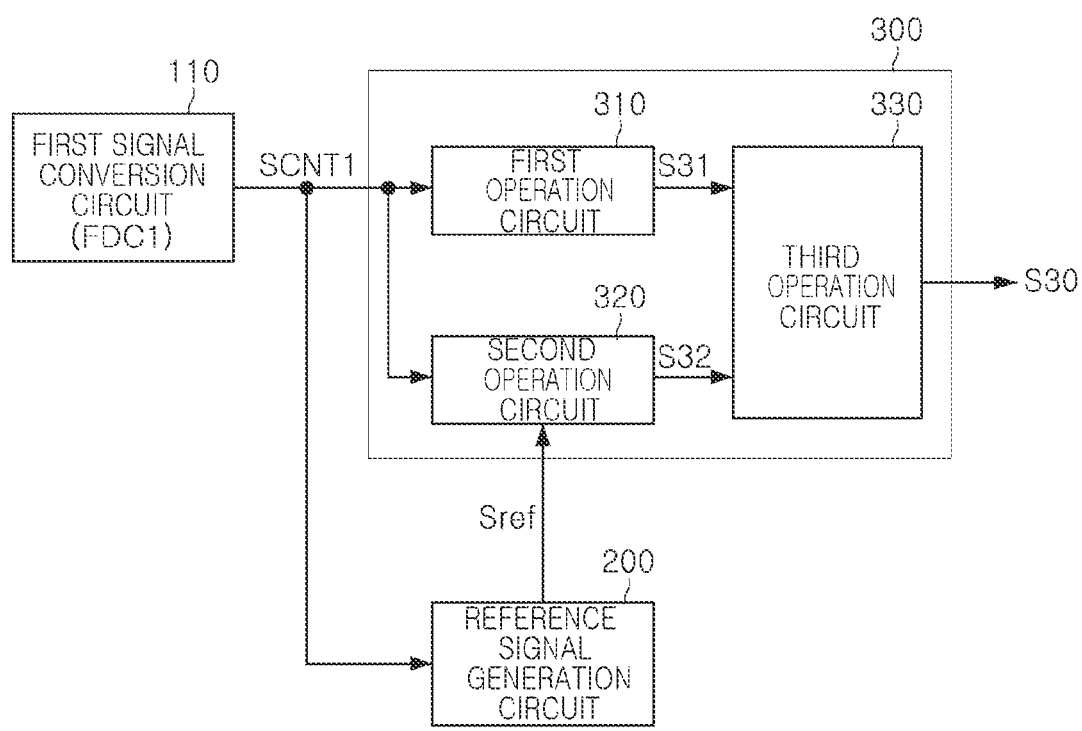
FIG. 7 is an example view illustrating an internal configuration of a signal operation circuit, according to an embodiment.
Figure 8:
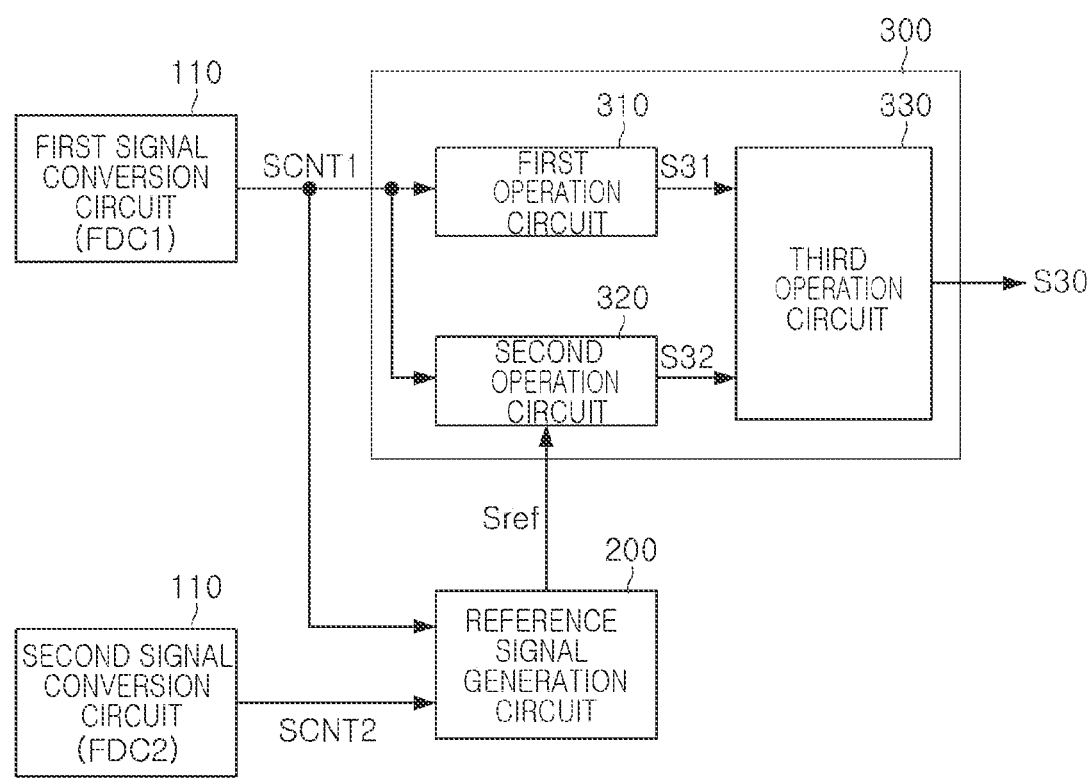
FIG. 8 is an example view illustrating an internal configuration of a signal operation circuit, according to an embodiment.

FIG. 6 is an example view illustrating an internal configuration of the signal operation circuit 300, according to an embodiment. FIG. 7 is an example view illustrating an internal configuration of the signal operation circuit 300, according to an embodiment. FIG. 8 is an example view illustrating an internal configuration of the signal operation circuit 300, according to an embodiment.

Referring to FIG. 7, based on a first detection signal SCNT1, the reference signal generation circuit 200 may periodically change the reference signal Sref according to a sampling clock based on a low-frequency signal value of the first detection signal SCNT1 when a touch manipulation is not sensed by a first sensor unit 51, and the reference signal generation circuit 200 may set and maintain the reference signal Sref as a specific value when the touch manipulation is sensed by the first sensor unit 51.

Referring to FIG. 8, based on a second detection signal SCNT2, the reference signal generation circuit 200 may periodically change a reference signal Sref in real time or according to a sampling clock based on a first detection signal SCNT1 when a touch manipulation is not sensed by a second sensor unit 52, and the reference signal generation circuit 200 may set and maintain the reference signal Sref as a specific value when the touch manipulation is sensed by the second sensor unit 52.

For example, in a reference signal value Sref[n-k] (where n and k are integers), when [n-0], i.e., [n] is a current point in time, [n-1] may be an immediately previous point in time. In this case, k may be a point in time before sampling. When k is 0, k may be a current time. When k is 1, k may be a first previous time. When k is 2, k may be a second previous time.

Referring to FIGS. 6, 7, and 8, the signal operation circuit 300 may include a first operation circuit 310, a second operation circuit 320, and a third operation circuit 330.

Referring to FIG. 6, for example, the first operation circuit 310 may generate a first operation signal S31 having high-frequency information of a first detection signal SCNT1.

The second operation circuit 320 may use the first detection signal SCNT1 to generate a second operation signal S32.

The third operation circuit 330 may operate the first operation signal S31 and the second operation signal S32 to generate the operation output signal S30.

Referring to FIGS. 7 and 8, for example, the first operation circuit 310 may generate the first operation signal S31, and the first operation signal S31 may include high-frequency information of the first detection signal SCNT1. For example, the first operation circuit 310 may subtract a signal in which the first detection signal SCNT1 is delayed from the first detection signal SCNT1, to output the first operation signal S31.

The second operation circuit 320 may generate the second operation signal S32, and the second operation signal S32 may have difference value information representing a difference between the first detection signal SCNT1 and the reference signal Sref. For example, the second operation circuit 320 may subtract the reference signal Sref from the first detection signal SCNT1 to output the second operation signal S32.

The third operation circuit 330 may operate the first operation signal S31 and the second operation signal S32 to generate the operation output signal S30. For example, the third operation circuit 330 may add the first operation signal S31 and the second operation signal S32 to output the operation output signal S30.

Referring to FIGS. 6 to 8, as an example, the high-frequency information of the first detection signal SCNT1 may be slope information.

Figure 9:
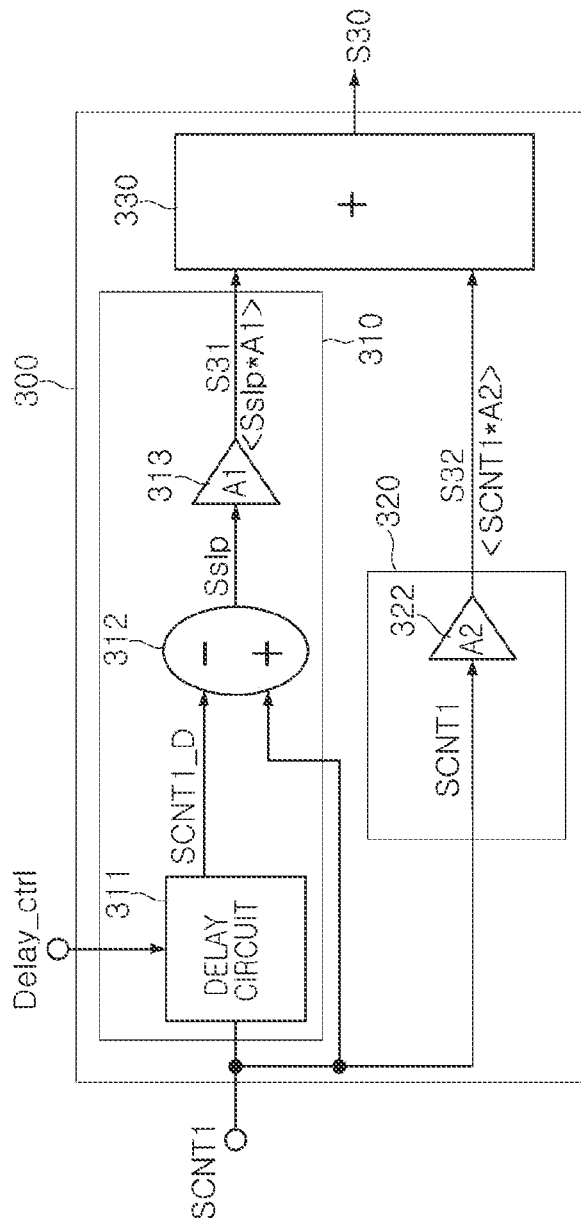
FIG. 9 is an example view illustrating a detailed configuration of a signal operation circuit, according to an embodiment.
Figure 10:
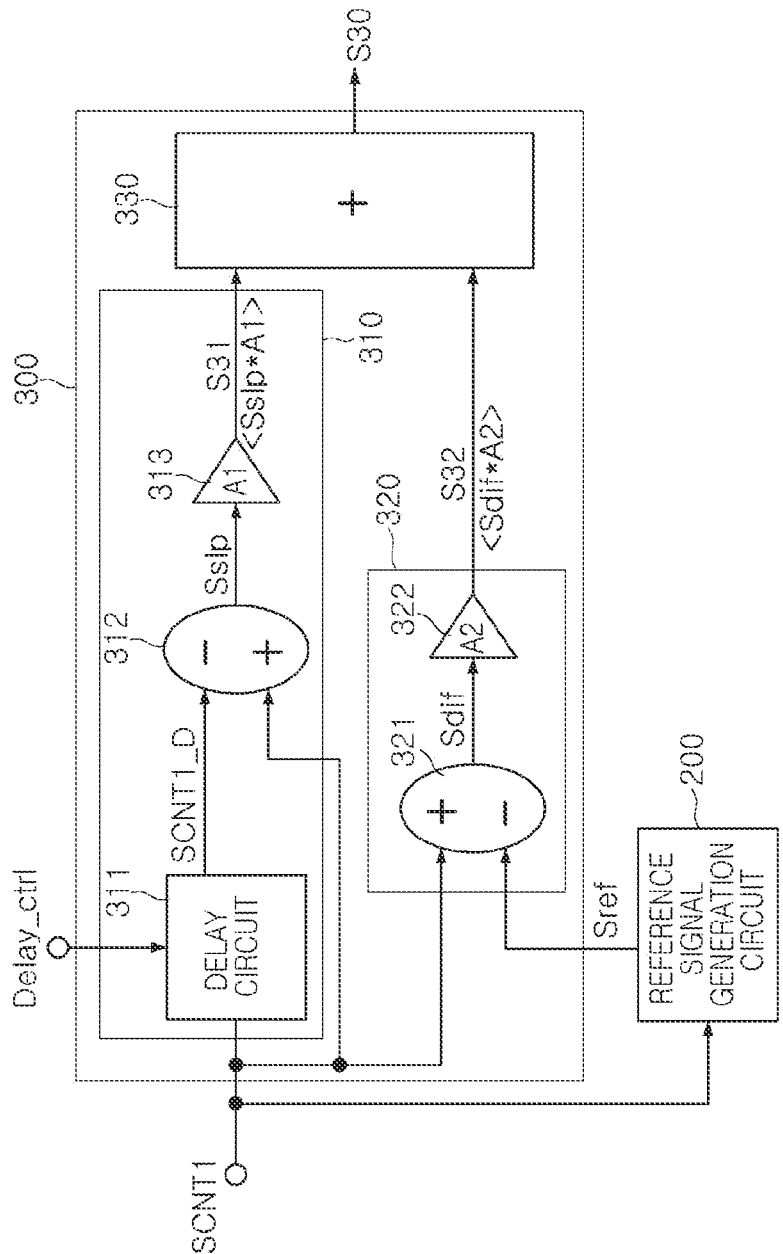
FIG. 10 is an example view illustrating a detailed configuration of a signal operation circuit, according to an embodiment.

FIG. 9 is an example view illustrating a detailed configuration of the signal operation circuit 300, according to an embodiment. FIG. 10 is an example view illustrating a detailed configuration of the signal operation circuit 300, according to an embodiment. and FIG. 11 is an example view illustrating a detailed configuration of the signal operation circuit, according to an embodiment.

Figure 11:
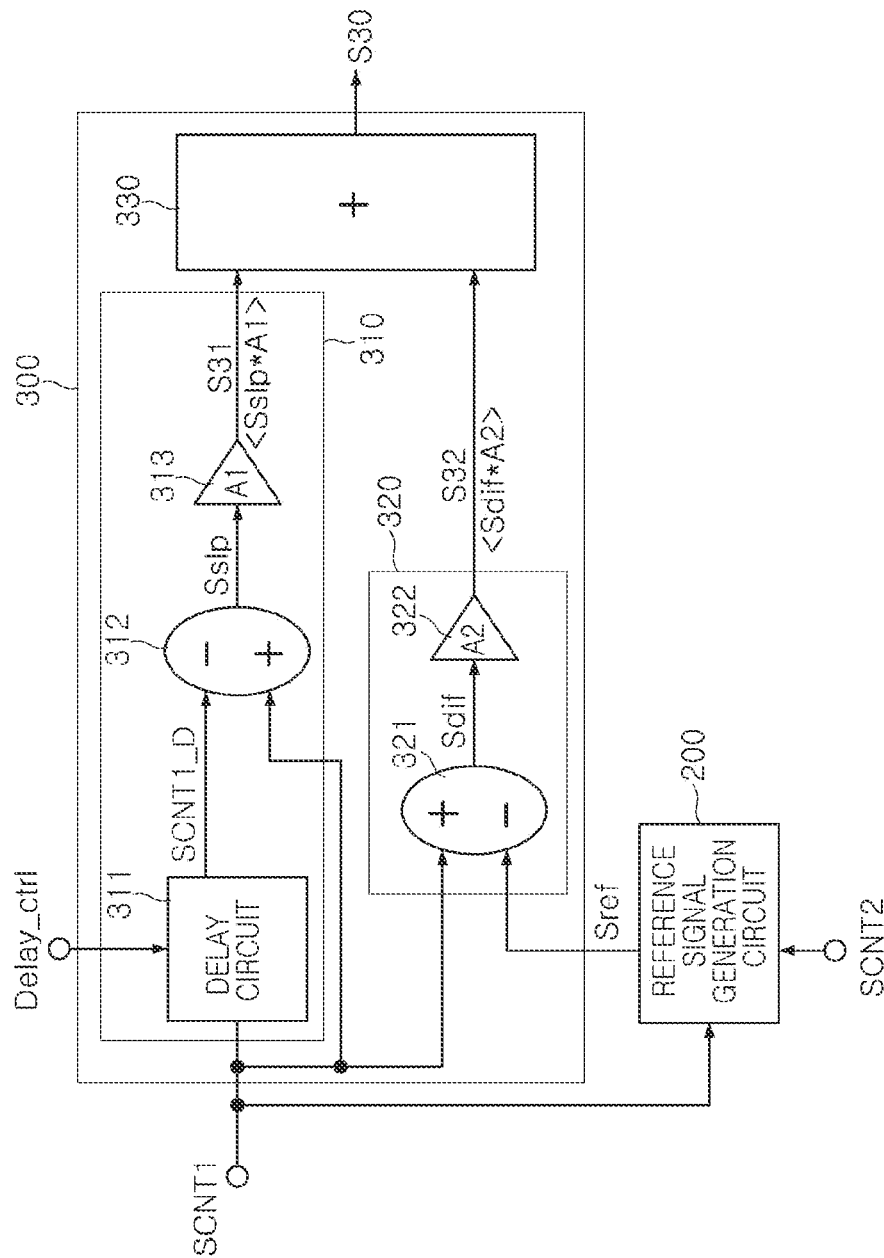
FIG. 11 is an example view illustrating a detailed configuration of a signal operation circuit, according to an embodiment.

Referring to FIGS. 9, 10, and 11, the first operation circuit 310 may include a delay circuit 311, a first subtraction circuit 312, and a first gain control circuit 313.

The delay circuit 311 may delay the first detection signal SCNT1 by a delay time according to a delay control signal Delay_ctrl to output a delay signal SCNT1_D. In this case, the delay time may be controlled according to the delay control signal Delay_ctrl.

As an example of generating a high-frequency signal, the first subtraction circuit 312 may subtract the delay signal SCNT1_D from the first detection signal SCNT1 to generate the high-frequency signal Sslp (i.e., Sslp=SCNT1-SCNT1_D).

The first gain control circuit 313 may multiply the high-frequency signal Sslp by a first gain A1 to generate the first operation signal S31. For example, the first gain A1 may be a real number greater than 0, but is not limited thereto, and may be appropriately set according to an electronic device environment in which the touch sensing device 20 is applied. In this case, the first gain control circuit 313 may be optional.

Referring to FIG. 9, the second operation circuit 320 may include a second gain control circuit 322. The second gain control circuit 322 may multiply the first detection signal SCNT1 by a second gain A2 to generate the second operation signal S32.

Referring to FIGS. 10 and 11, the second operation circuit 320 may include a second subtraction circuit 321 and the second gain control circuit 322.

The second subtraction circuit 321 may subtract the reference signal Sref from the first detection signal SCNT1 to generate a difference signal Sdif.

The second gain control circuit 322 may multiply the difference signal Sdif by the second gain A2 to generate the second operation signal S32. For example, the second gain A2 may be a real number greater than 0, but is not limited thereto, and may be appropriately set according to an electronic device environment in which the touch sensing device 20 is applied. In this case, the second gain control circuit 322 may be optional.

In FIG. 11, for example, the first sensor unit 51 may be an inductive force sensor and the second sensor unit 52 may be a capacitive touch sensor. When a hybrid sensor including the first sensor unit 51 and the second sensor unit 52 is implemented, a change in the second sensing signal Ssen2 generated by the second sensor unit 52 may occur and then a change in first sensing signal Ssen1 by the first sensor unit may occur, in a case of one (1) touch manipulation by a user.

In a case in which the second sensor unit 52 is used to prevent a malfunction, when a change in second sensing signal Ssen2 by the second sensor unit 52 is sensed, a reference signal Sref of the first sensor unit 51 may be fixed and maintained as a specific value. Therefore, a more stable reference signal may be provided without being affected by environmental changes.

For example, when an absolute value of a high-frequency signal Sspl is equal to or less than a specific value, the aforementioned case may not be reflected. The aforementioned case is applicable to process force applied when the user touches and manipulates a touch member, as a valid value, when the force is always equal to or greater than a certain value.

Figure 12:
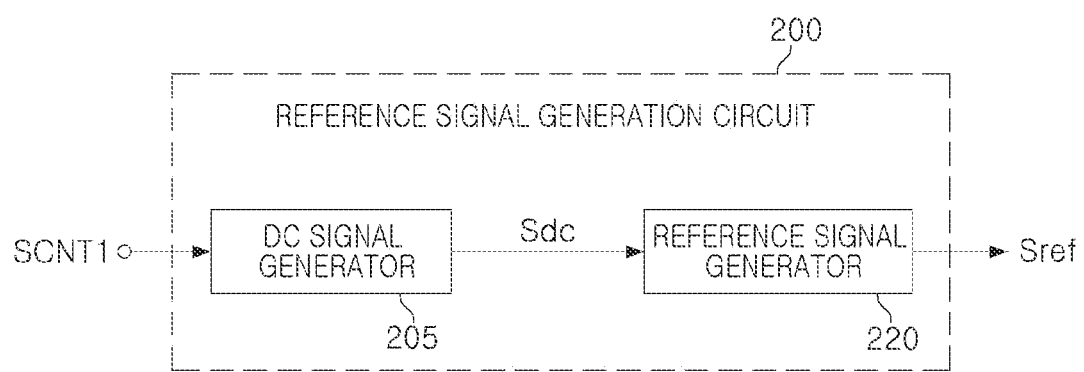
FIG. 12 is an example view illustrating a reference signal generation circuit, according to an embodiment.

FIG. 12 is an example view illustrating the reference signal generation circuit 200, according to an embodiment.

Referring to FIG. 12, the reference signal generation circuit 200 may include a direct current (DC) signal generator 205 and a reference signal generator 220.

The DC signal generator 205 may detect a low-frequency signal value Sdc of the first detection signal SCNT1.

The reference signal generator 220 may use the low-frequency signal value Sdc to generate the reference signal Sref.

Figure 13:
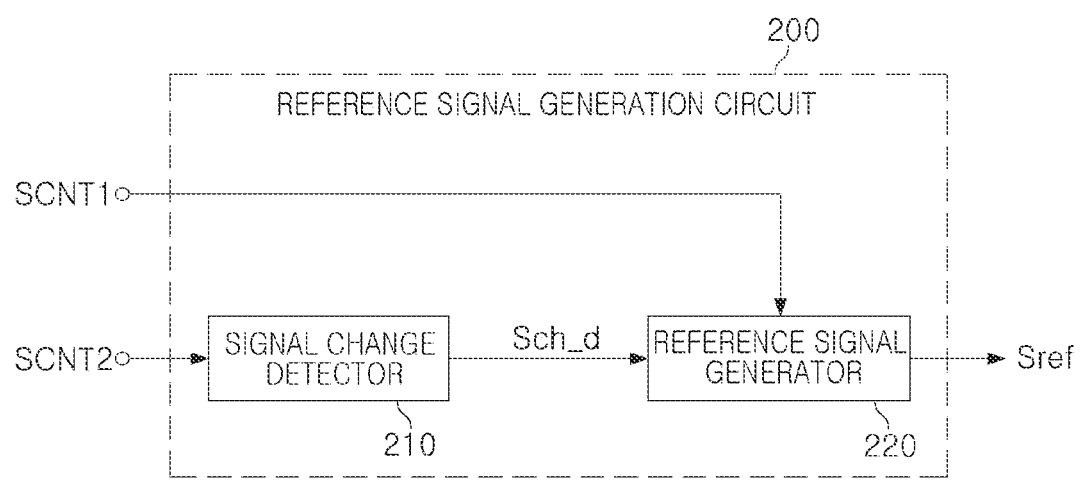
FIG. 13 is an example view illustrating a reference signal generation circuit, according to an embodiment.

FIG. 13 is an example view illustrating the reference signal generation circuit 200, according to an embodiment.

Referring to FIG. 13, the reference signal generation circuit 200 may include a signal change detector 210 and the reference signal generator 220.

The signal change detector 210 may detect a change in the second detection signal SCNT2 to output a change detection signal Sch_d.

The reference signal generator 220 may generate a reference signal, according to the change in second detection signal SCNT2, based on the change detection signal Sch_d. For example, when the change in the second detection signal SCNT2 is detected, the reference signal Sref may be set and maintained as a specific value. When there is no change in the second detection signal SCNT2, the first detection signal SCNT1 may be used to change the reference signal Sref.

For example, the specific value of the reference signal generation circuit 200 may be determined as any one selected from a current value of the first detection signal SCNT1, a value of the first detection signal SCNT1 before a predetermined time, and a value of the first detection signal SCNT1 after a predetermined time, based on a point in time when it is determined that there is a change in the second detection signal SCNT2.

As described above, a reference signal for the first sensor unit 51 may be generated using the second sensor unit 52.

For example, a reference signal of the first sensor unit 51 may be a value of the first sensing signal Ssen1 (i.e., a low-frequency signal value) in a state in which no touch manipulation is applied. The low-frequency signal value of the first sensing signal Ssen1 may fluctuate according to influence of surrounding environments such as a temperature and physical deformation of a touch member. This may cause a malfunction in touch sensing. To prevent this malfunction, the disclosure herein provides a method of utilizing the second sensor unit 52. Therefore, a magnitude of the reference signal Sref may be fixed (held) to generate a stable reference signal, when a change in second sensing signal Ssen2 is sensed by the second sensor unit 52.

As an example, the second sensor unit 52 may include a capacitive sensor, and the first sensor unit 51 may include an inductive sensor. For example, since the user is first in contact with the touch member TM1 formed on the cover of the electronic device (FIGS. 3 and 10) by the user 1 (e.g., a hand), a change in the detection signal by capacitive sensing due to the contact may occur first. When the change in the detection signal is sensed, a value of a reference signal for inductive sensing in the first sensor unit 51 may be fixed.

Also, in the reference signal generation circuit, the first sensor unit 51 may be a force sensor configured to sense force, and the second sensor unit 52, which is configured to sense a touch, may be any one selected from a touch sensor, an ultrasonic sensor, a temperature sensor, a proximity sensor, and an optical sensor. As an example, the force sensor may be a pressure sensor adopting any one selected from a resistance change method, a capacitive method, an inductive method, and a piezo method.

Figure 14:
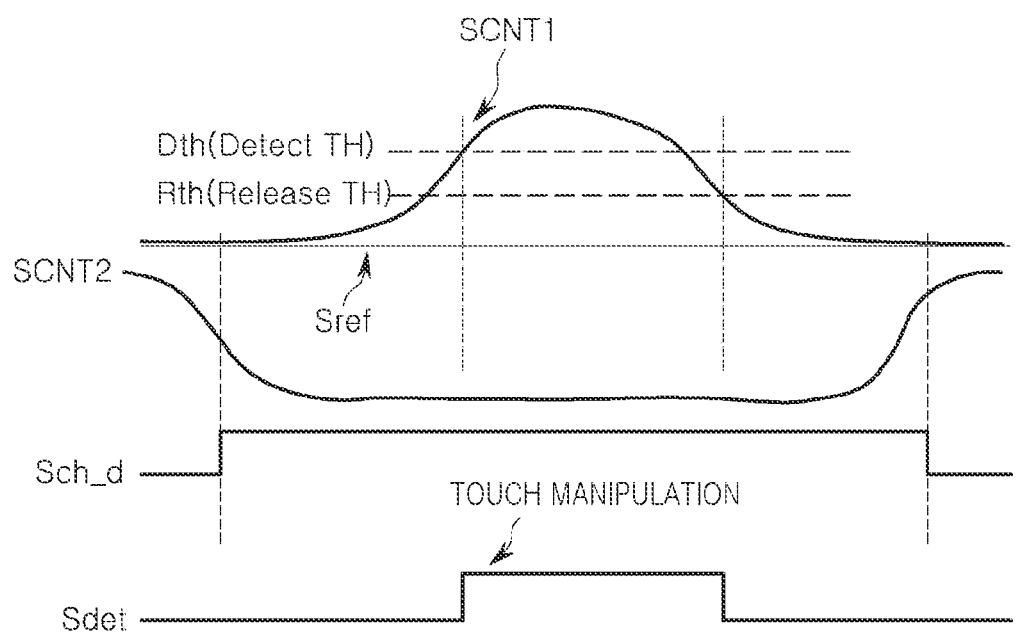
FIG. 14 is an example view illustrating waveforms of first and second detection signals, change detection signals, and touch detection signals, according to an embodiment.

FIG. 14 is an example view illustrating waveforms of the first and second detection signals SCNT1 and SCNT2, change detection signals Sch_d, and touch detection signals Sdet, according to an embodiment.

Focusing on differences from FIG. 4, referring to FIG. 14, when a level of a second detection signal SCNT2 is lower than a predetermined reference level based on the second detection signal SCNT2 decreasing a signal level when a touch is sensed by the second sensor unit 52 based on the second sensor unit 52, a level of a change detection signal Sch_d may become a high level, and a touch detection signal Sdet may be generated based on the first detection signal SCNT1, while maintaining the change detection signal Sch_d on the high level.

Although it is illustrated in FIG. 14 that, when touched, a waveform of the first detection signal SCNT1 increases and a waveform of the second detection signal SCNT2 decreases, the case illustrated in FIG. 14 is merely an example. When a touch is applied to a sensor having an opposite type, the waveform of the first detection signal SCNT1 may decrease and the waveform of the second detection signal SCNT2 may increase. Therefore, the disclosure is not limited to the above example.

Figure 15:
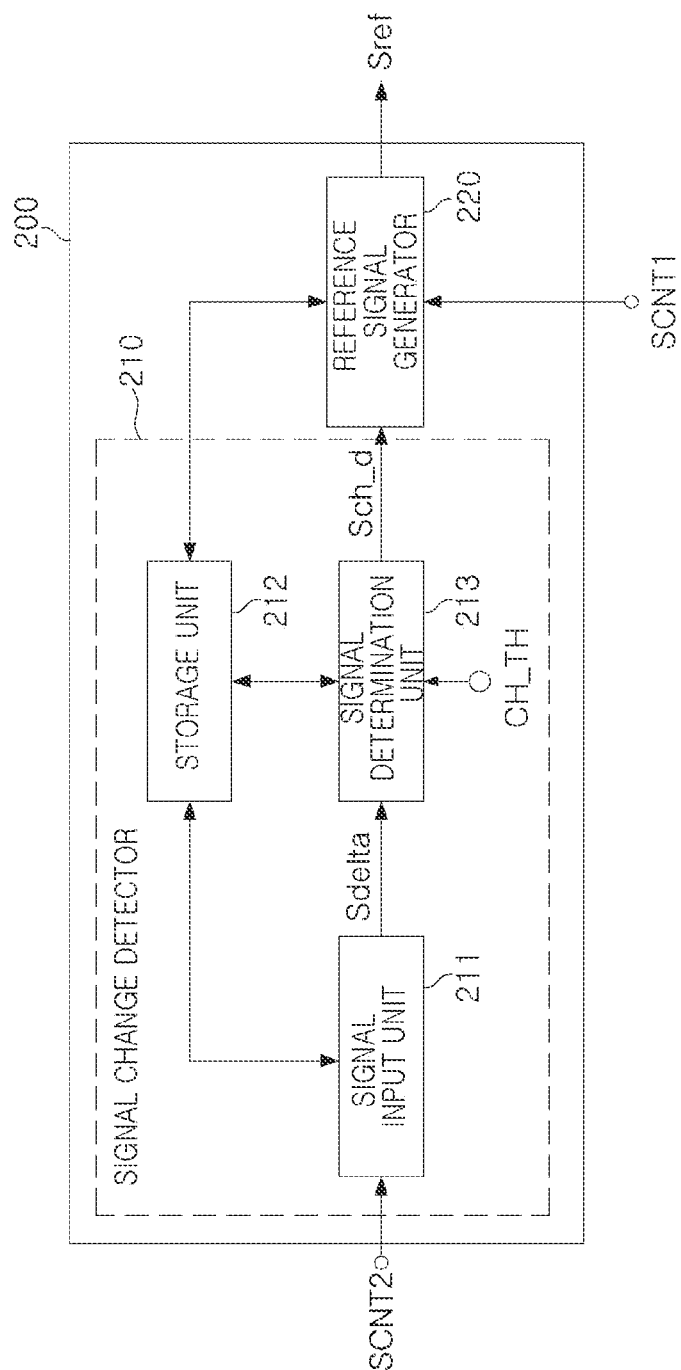
FIG. 15 is an example view illustrating an internal configuration of a reference signal generation circuit, according to an embodiment.

FIG. 15 is an example view illustrating an internal configuration of the reference signal generation circuit 200, according to an embodiment.

Referring to FIG. 15, the reference signal generation circuit 200 may include the signal change detector 210 and the reference signal generator 220.

The signal change detector 210 may include a signal input unit (or signal inputter) 211, a storage unit (or storage) 212, and a signal determination unit (or signal determiner) 213.

The signal input unit 211 may output a signal change value Sdelta for a second detection signal SCNT2 input from the second sensor unit 52. As an example, the signal change value Sdelta may be a signal change magnitude based on the second detection signal SCNT2 when there is no touch input.

The storage unit 212 may store the second detection signal SCNT2 and the signal change value Sdelta from the signal input unit 211.

The signal determination unit 213 may generate the change detection signal Sch_d including information (e.g., a high level) indicating that there is a change in the second detection signal SCNT2 when the signal change value Sdelta is greater than a change threshold value CH-TH, and information (e.g., a low level) indicating that there is no change in the second detection signal SCNT2 when the signal change value Sdelta is less than the change threshold value CH-TH. For example, when the change detection signal Sch_d, output from the signal determination unit 213, is at a low level, no signal change detection may be determined, when the change detection signal Sch_d is at a high level, a signal change detection may be determined, and when the change detection signal Sch_d after signal detection is at a low level, release of a signal change detection may be determined.

In addition, the reference signal generator 220 may determine a change in signal by the second sensor unit 52 based on the change detection signal Sch_d. For example, when there is a change in signal, the reference signal Sref may be set and maintained as a specific value, and when there is no change in signal, the reference signal Sref may be changed in real time or periodically using the first detection signal SCNT1.

Figure 16:
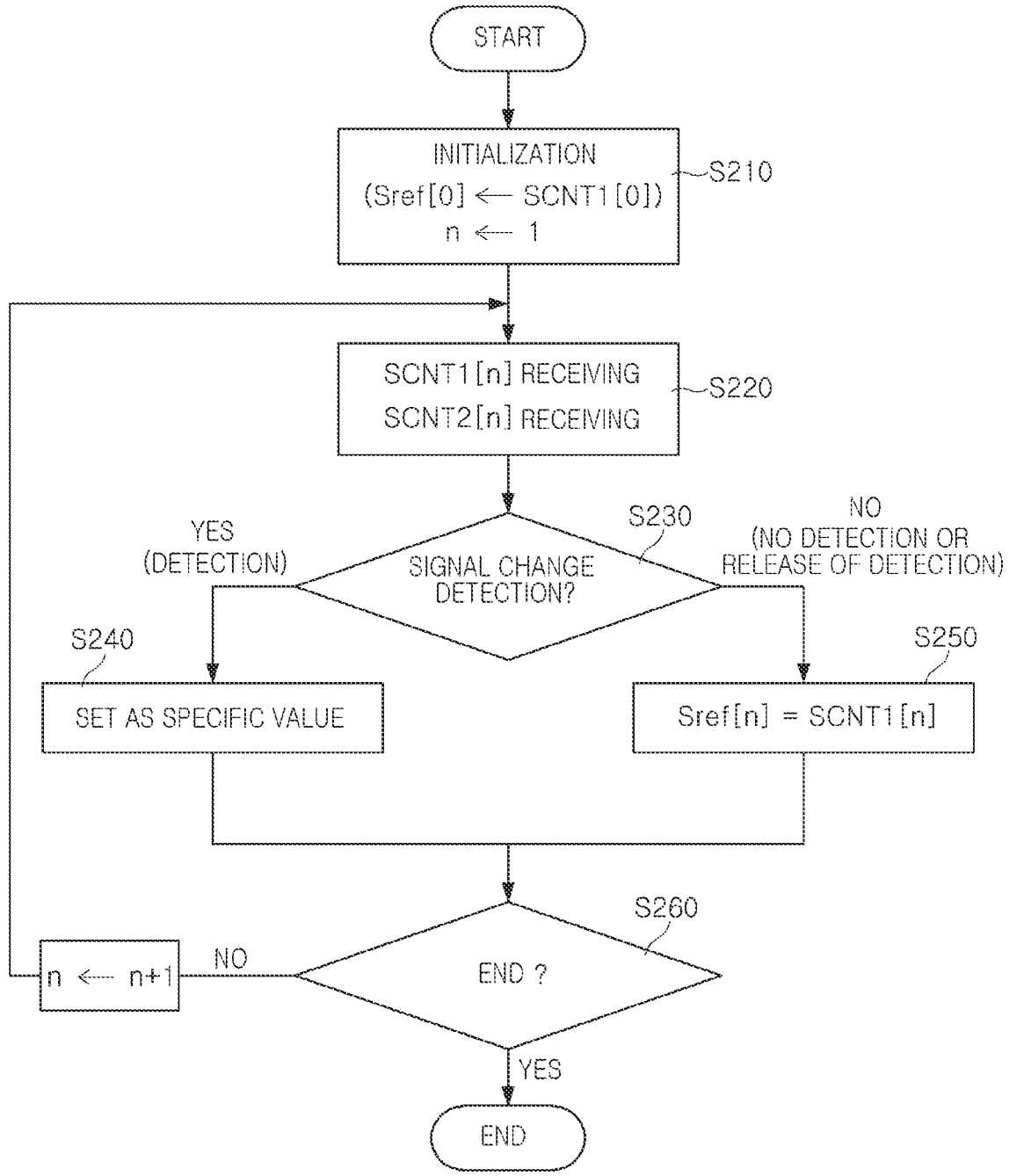
FIG. 16 is a flowchart illustrating operations of a reference signal generation circuit, according to an embodiment.

FIG. 16 is a flowchart illustrating operations of the reference signal generation circuit 200, according to an embodiment.

Referring to FIGS. 11 and 16, the reference signal generation circuit 200 may first perform an initialization process in operation S210, to allocate a first detection signal value SCNT1 [0] of the first sensor unit 51 to an initial reference signal value Sref[0].

Then, in operation S220, the reference signal generation circuit 200 may receive a first detection signal value SCNT1 [$n$] at a current point in time by the first sensor unit 51 and a second detection signal value SCNT2[$n$] at the current point in time by the second sensor unit 52.

Then, in operation S230, the reference signal generation circuit 200 may determine a change in signal of the second detection signal value SCNT2[$n$]. For example, in the change in signal with respect to the second detection signal value SCNT2[$n$], it may be determined that there is a change in signal when the signal change value Sdelta (FIG. 15), corresponding to a difference value between the signal value SCNT2[$n$] of the second detection signal SCNT2 and a low-frequency signal value SCNT2 DC[$n$] of the second detection signal SCNT2, is equal to or greater than the change threshold value (FIG. 15, CH_TH).

Alternatively, when the signal change value Sdelta (FIG. 15) is less than the change threshold value (FIG. 15, CH_TH), the reference signal generation circuit 200 may determine that there is no change in signal. An example of determining that there is no change in signal may be a case in which there is no touch input by the second sensor unit 52 or a case in which a touch input by the second sensor unit 52 is released after the touch input.

Then, when there is a change in the second detection signal SCNT2, the reference signal generation circuit 200 may set and maintain the reference signal Sref as a specific value, in operation S240. When there is no change in the second detection signal SCNT2, the reference signal generation circuit 200 may change the reference signal using the first detection signal value SCNT1 [$n$] input to the reference signal value Sref[$n$], in operation S250.

Then, in operation S260, it is determined whether the process of generating the reference signal Sref ends. When not ended, operation S220 including receiving the first and second detection signals SCNT1[$n$] and SCNT2[$n$] may be repeated. When ended, the process of generating the reference signal Sref may end.

Figure 17:
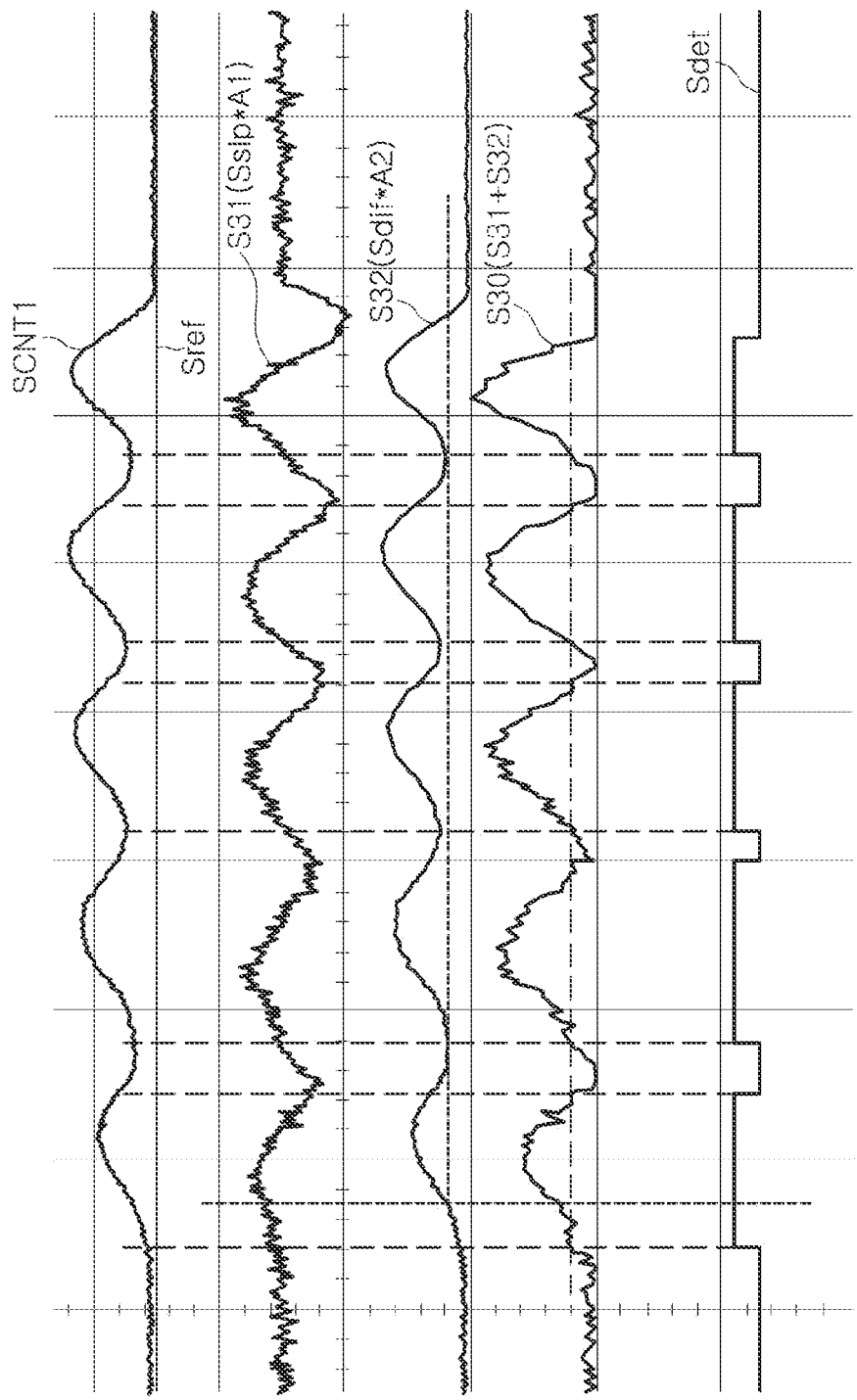
FIG. 17 is an example view illustrating main signals of a touch sensing device for a high-speed continuous touch manipulation, according to an embodiment.

FIG. 17 is an example view illustrating main signals of a touch sensing device for a high-speed continuous touch manipulation.

In FIG. 17, SCNT1 may be the first detection signal output from the first signal conversion circuit 110 of FIG. 3. Sref may be the reference signal output from the reference signal generation circuit 200 of FIG. 3. S31 may be the first operation signal output from the first operation circuit 310 of FIG. 8. S32 may be the second operation signal output from the second operation circuit 320 of FIG. 8. S30 may be the operation output signal output from the third operation circuit 330 of FIG. 8. Sdet may be the touch detection signal Sdet output from the touch detector 400 of FIG. 3.

In addition, referring to FIGS. 11 and 17, when a user quickly and continuously applies a touch manipulation (e.g., press application) and releases the touch manipulation (e.g., press release), a sudden change in the first detection signal SCNT1 may appear. Such a sudden change may be reflected in the high-frequency signal Sslp. The operation output signal S30 may be generated by adding the first operation signal S31 (S31=Sslp*A1), in which a gain from the high-frequency signal Sslp is adjusted, and the second operation signal S32 (S32=Sdif*A2). The operation output signal S30 generated by this operation process may include a signal level that is equal to or less than the release threshold value (a horizontal dotted line in S30 in FIG. 17) when the touch is released (e.g., press release), to accurately sense a fast, continuous touch manipulation.

Figure 18:
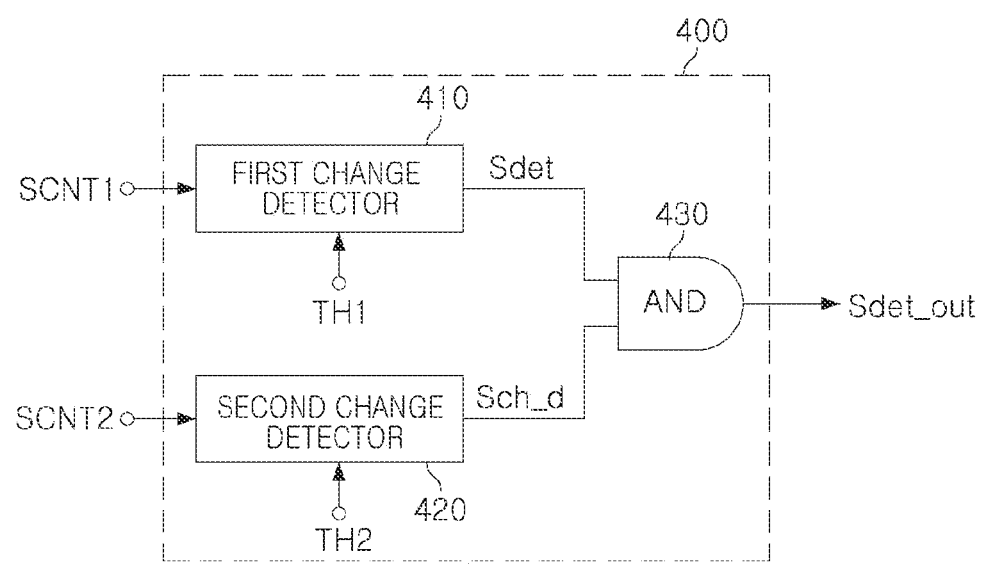
FIG. 18 is an example view illustrating a touch detector, according to an embodiment.

FIG. 18 is an example view illustrating the touch detector 400, according to an embodiment.

Referring to FIG. 18, the touch detector 400 may include a first change detector 410, a second change detector 420, and a detection signal generator 430, to more stably detect a manipulation by a user.

The first change detector 410 may detect a change in the first detection signal SCNT1 to generate the touch detection signal Sdet having detection result information. For example, when a value of the first detection signal SCNT1 is equal to or greater than a threshold value TH1, the first change detector 410 may detect a change in signal to output the touch detection signal Sdet having a high level.

The second change detector 420 may detect a change in the second detection signal SCNT2 to output a change detection signal Sch_d having detection result information. For example, when a value of the second detection signal SCNT2 is equal to or greater than a threshold value TH2, the second change detector 420 may detect a change in signal to output the change detection signal Sch_d having a high level.

The detection signal generator 430 may generate a final touch detection signal Sdet_out having final detection information indicating whether a touch manipulation has occurred by the first sensor unit 51, based on the touch detection signal Sdet received from the first change detector 410 and the change detection signal Sch_d received from the second change detector 420.

As an example, the detection signal generator 430 may include an AND gate performing an AND operation on the touch detection signal Sdet and the change detection signal Sch_d.

Figure 19:
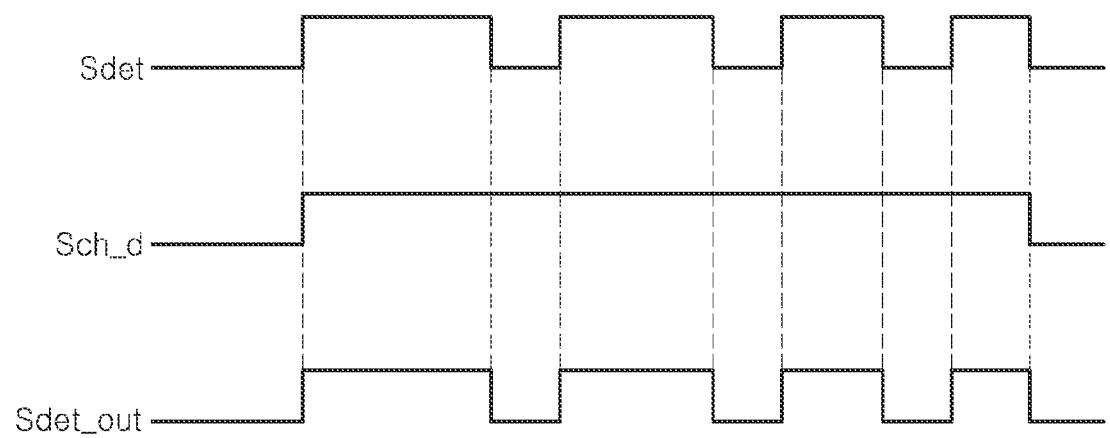
FIG. 19 is an example view illustrating a touch detection signal, a change detection signal, and a final touch detection signal of FIG. 18.
Figure 20:
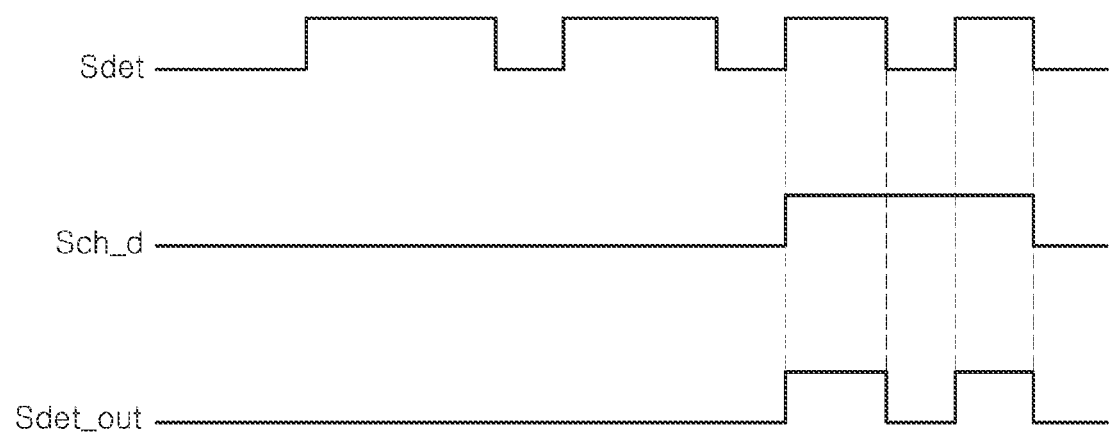
FIG. 20 is another example view illustrating the touch detection signal, the change detection signal, and the final touch detection signal of FIG. 18.

FIG. 19 is an example view illustrating the touch detection signal Sdet, the change detection signal Sch_d, and the final touch detection signal Sdet_out of FIG. 18, according to an embodiment. FIG. 20 is another example view illustrating the touch detection signal, the change detection signal, and the final touch detection signal Sdet_out of FIG. 18, according to an embodiment.

Referring to FIGS. 19 and 20, the detection signal generator 430 may output the final touch detection signal Sdet_out having a high level, when a touch detection signal Sdet and a change detection signal Sch_d have high levels.

Therefore, when the change detection signal Sch_d is maintained to have a high level, the final touch detection signal Sdet_out may have the same state as the touch detection signal Sdet.

For example, when the change detection signal Sch_d is a signal generated by a user's touch, the touch detection signal Sdet may be normally output only when the user touches. Therefore, a malfunction may be prevented, and more accurate touch detection is possible.

The touch sensing device described herein may be applied to and used in a switch (e.g., a mobile side switch, a touch glass) of a mobile device or a wearable device, for example.

According to embodiments, a touch sensing device operating electronically to replace a mechanical switch may use a change rate of a signal magnitude as well as a change in signal magnitude by a signal operation processing manipulation, to sense a plurality of continuous touches at high speed. In addition, the touch sensing device may sense a plurality of touch manipulations regardless of speed and, in particular, may smoothly sense a plurality of continuous, fast touch manipulations.

In addition, the touch sensing device may generate a reference signal based on whether a touch manipulation has occurred to exclude changes due to an external environment of the touch sensing device.

The signal inputter 211, the storage 212, and the signal determiner 213 in FIGS. 1 to 20 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 20 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch sensing device, comprising:
   a first signal conversion circuit configured to convert a first sensing signal from a first sensor unit into a first detection signal, the first detection signal being a digital signal;
   a signal operation circuit configured to operate the first detection signal and a high-frequency signal based on the first detection signal, to generate an operation output signal;
   a touch detector configured to determine whether a touch manipulation has occurred, based on the operation output signal, to generate a touch detection signal having determination result information; and
   a reference signal generation circuit configured to generate a reference signal based on the first detection signal.

2. The touch sensing device of claim 1, further comprising a second signal conversion circuit configured to convert a second sensing signal from a second sensor unit into a second detection signal, the second detection signal being another digital signal.

3. The touch sensing device of claim 2, wherein the reference signal generation circuit is further configured to:
   use the second sensor unit to determine whether a change in signal of the second detection signal occurs; and
   perform either one of setting the reference signal as a specific value, in response to determining that the change in signal of the second detection signal occurs, and using the first detection signal to change the reference signal, in response to determining that the change in signal of the second detection signal does not occur.

4. The touch sensing device of claim 2, wherein the reference signal generation circuit comprises:
   a signal change detector configured to detect a change in the second detection signal to output a change detection signal; and
   a reference signal generator configured to:
   determine whether a change in signal of the second detection signal occurs, based on the change detection signal; and
   perform either one of setting the reference signal as a specific value, in response to determining that the change in signal of the second detection signal occurs, and using the first detection signal to set the reference signal, in response to determining that the change in signal of the second detection signal does not occur.

5. The touch sensing device of claim 2, wherein the reference signal generation circuit comprises:
   a signal inputter configured to output a signal change value of a second detection signal;
   a storage configured to store the second detection signal and the signal change value, upon the second detection signal and the signal change value being input from the signal inputter;
   a signal determiner configured to generate a change detection signal including information indicating that there is a change in the second detection signal when the signal change value is equal to or greater than a change threshold value, and information indicating that there is no change in the second detection signal when the signal change value is lower than the change threshold value; and
   a reference signal generator configured to:
   determine whether a change in signal of the second detection signal occurs, based on the change detection signal; and
   perform either one of setting the reference signal as a specific value, in response to determining that the change in signal of the second detection signal occurs, and using the first detection signal to change the reference signal, in response to determining that the change in signal of the second detection signal does not occur.

6. The touch sensing device of claim 2, wherein the touch detector comprises:
   a first change detector configured to detect a change in the first detection signal to generate the touch detection signal having the detection result information;
   a second change detector configured to detect a change in the first detection signal to output a change detection signal having additional detection result information; and a detection signal generator configured to generate a final touch detection signal having final information indicating whether the touch manipulation has occurred by the first sensor unit, based on the touch detection signal and the change detection signal.

7. The touch sensing device of claim 1, wherein the reference signal generation circuit is further configured to change the reference signal, based on a low-frequency signal value of the first detection signal.

8. The touch sensing device of claim 1, wherein the signal operation circuit comprises:
a first operation circuit configured to generate a first operation signal having high-frequency information of the first detection signal;
a second operation circuit configured to generate a second operation signal having difference value information representing a difference between the first detection signal and the reference signal; and
a third operation circuit configured to operate the first operation signal and the second operation signal to generate the operation output signal.

9. The touch sensing device of claim 8, wherein the first operation circuit comprises:
a delay circuit configured to delay the first detection signal to output a delay signal;
a first subtraction circuit configured to subtract the delay signal from the first detection signal to generate the high-frequency signal; and
a first gain control circuit configured to multiply the high-frequency signal by a first gain to generate the first operation signal.

10. The touch sensing device of claim 8, wherein the second operation circuit comprises:
a second subtraction circuit configured to subtract the reference signal from the first detection signal to generate a difference signal; and
a second gain control circuit configured to multiply the difference signal by a second gain to generate the second operation signal.

11. The touch sensing device of claim 1, wherein the reference signal generation circuit comprises:
a direct current (DC) signal generator configured to detect a low-frequency signal value of the first detection signal; and
a reference signal generator configured to use the low-frequency signal value to generate the reference signal.

12. The touch sensing device of claim 1, wherein the high-frequency signal is any one of a slope signal based on the first detection signal, a differential signal for the first detection signal, a high-frequency filter signal based on the first detection signal, a bandpass filter signal based on the first detection signal, and a signal resulting from a low-frequency signal being removed from the first detection signal.

13. A reference signal generation circuit, comprising:
a signal change detector configured to detect a change in a second detection signal input from a second sensor unit, to output a change detection signal; and
a reference signal generator configured to:
determine whether a change in signal of the second detection signal occurs, based on the change detection signal; and
perform either one of setting a reference signal for a first detection signal input from a first sensor unit as a specific value, in response to determining that the change in signal of the second detection signal occurs, and using the first detection signal to change the reference signal, in response to determining that the change in signal of the second detection signal does not occur.

14. The reference signal generation circuit of claim 13, wherein the signal change detector is further configured to:
generate a signal change value for the second detection signal input from the second sensor unit; and
generate a change detection signal including information indicating that there is a change in the second detection signal when the signal change value is equal to or greater than a change threshold value, and information indicating that there is no change in the second detection signal when the signal change value is lower than the change threshold value.

15. The reference signal generation circuit of claim 13, wherein the signal change detector comprises:
a signal inputter configured to output a signal change value for the second detection signal;
a storage configured to store the second detection signal and the signal change value, input from the signal input unit;
a signal determiner configured to determine a change detection signal including information indicating that there is a change in the second detection signal when the signal change value is equal to or greater than a change threshold value, and information indicating that there is no change in the second detection signal when the signal change value is lower than the change threshold value; and
a reference signal generator configured to:
determine whether the change in signal of the second detection signal occurs based on the change detection signal; and
perform either one of the setting of the reference signal as a specific value, in response to determining that the change in signal of the second detection signal occurs, or the using of the first detection signal to change the reference signal, in response to determining that the change in signal of the second detection signal does not occur.

16. The reference signal generation circuit of claim 13, wherein the specific value of the reference signal generator is determined as any one of a current value of the first detection signal, a value of the first detection signal before a predetermined time, and a value of the first detection signal after a predetermined time, based on a point in time when it is determined that the change in signal of the second detection signal occurs.

17. The reference signal generation circuit of claim 13, wherein the first sensor unit is a force sensor configured to sense force, and
the second sensor unit is configured to sense a touch, and is any one of a touch sensor, an ultrasonic sensor, a temperature sensor, a proximity sensor, and an optical sensor.

18. The reference signal generation circuit of claim 17, wherein the force sensor is a pressure sensor configured to implement any one of a resistance change method, a capacitive method, an inductive method, and a piezo method.

19. An electronic device, including:
a cover;
a touch member formed in a portion of the cover;
a first sensor unit configured to generate a first detection signal that varies in response to a touch applied to the touch member;

a second sensor unit configured to generate a second detection signal that varies in response to pressure applied to the touch member;

a reference signal generation circuit configured to generate a reference signal based on the first detection signal, and further based on whether a change in the second detection signal occurs; and a signal operation circuit configured to generate an operation output signal based on the first detection signal and the reference signal.

20. The electronic device of claim 19, wherein the reference signal generation circuit is further configured to:

set the reference signal as a specific value, in response to determining that the change in the second detection signal occurs; or use the first detection signal to change the reference signal, in response to determining that the change in the second detection signal does not occur.

21. The electronic device of claim 19, wherein the reference signal generation circuit is further configured to generate the reference signal based on a direct current value of the first detection signal.

22. The electronic device of claim 21, wherein the signal operation circuit is further configured to generate the operation output signal based on any one of a slope signal based on the first detection signal, a differential signal for the first detection signal, a high-frequency filter signal based on the first detection signal, a bandpass filter signal based on the first detection signal, and a signal resulting from a low-frequency signal being removed from the first detection signal.

23. The electronic device of claim 19, further comprising a touch detector configured to generate a touch detection signal indicating whether a touch manipulation has been applied to the touch member, by comparing the operation output signal to a threshold value.

24. The electronic device of claim 23, wherein the touch detector is further configured to:

generate a change detection signal including change detection information of the second detection signal; and generate a final touch detection signal indicating whether the touch manipulation has been applied to the touch member, based on the touch detection signal and the change detection signal.

* * * * *